United States Patent Office 3,388,985
Patented June 18, 1968

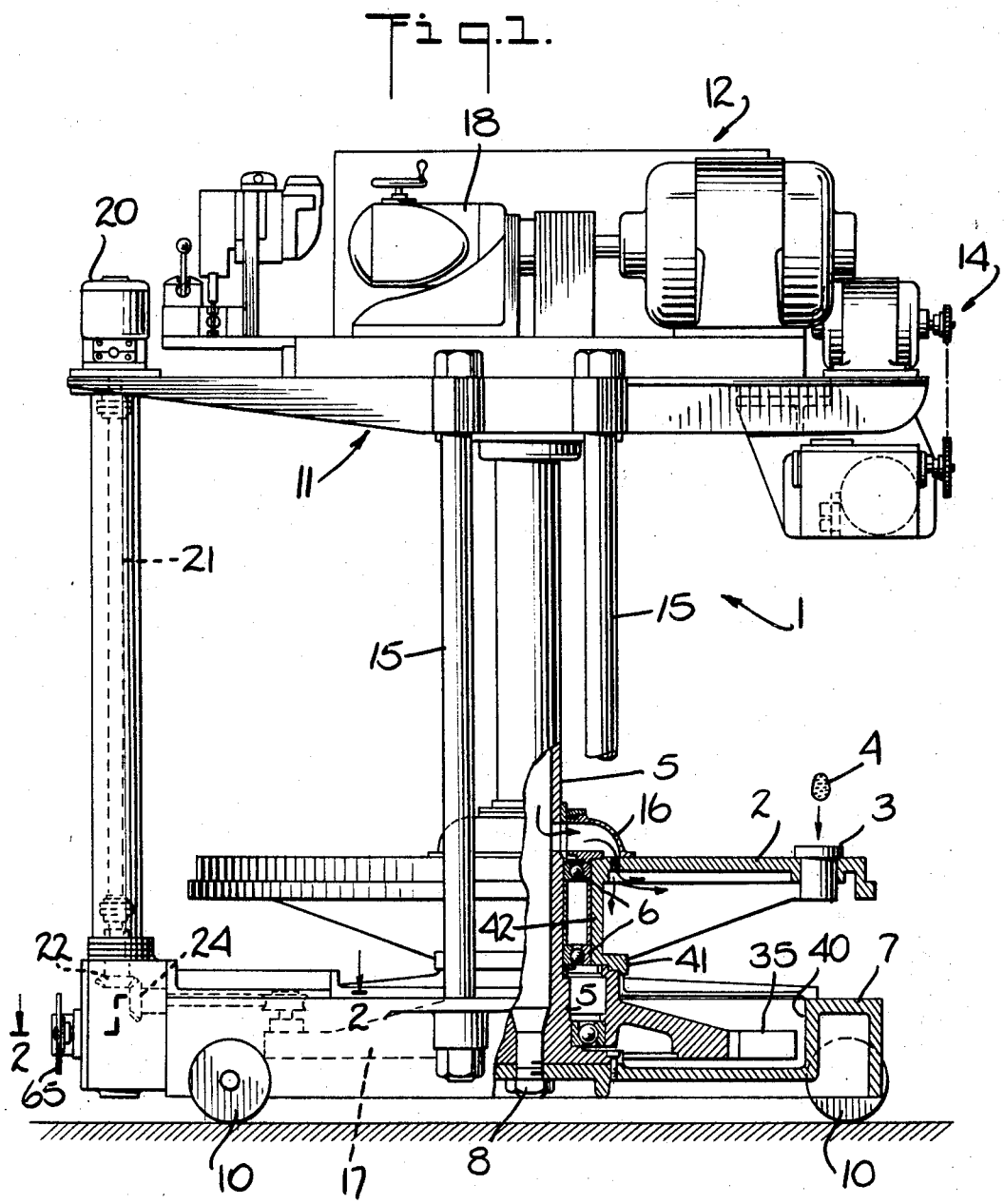

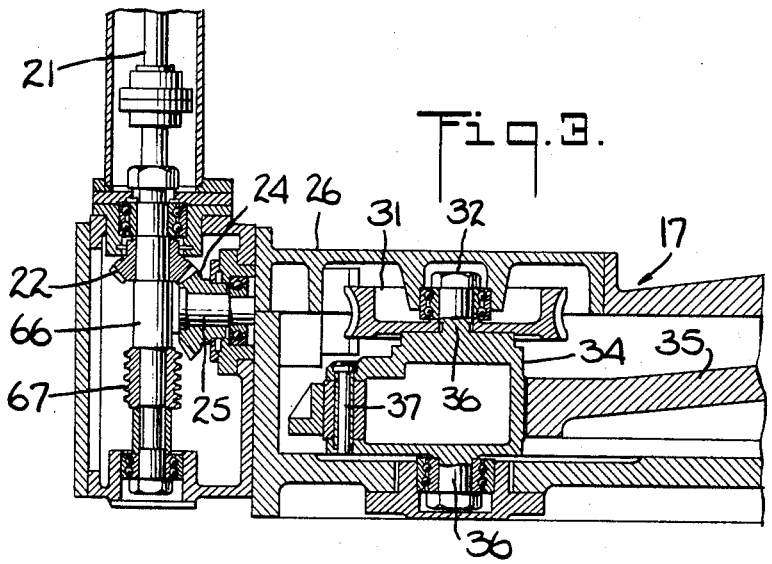
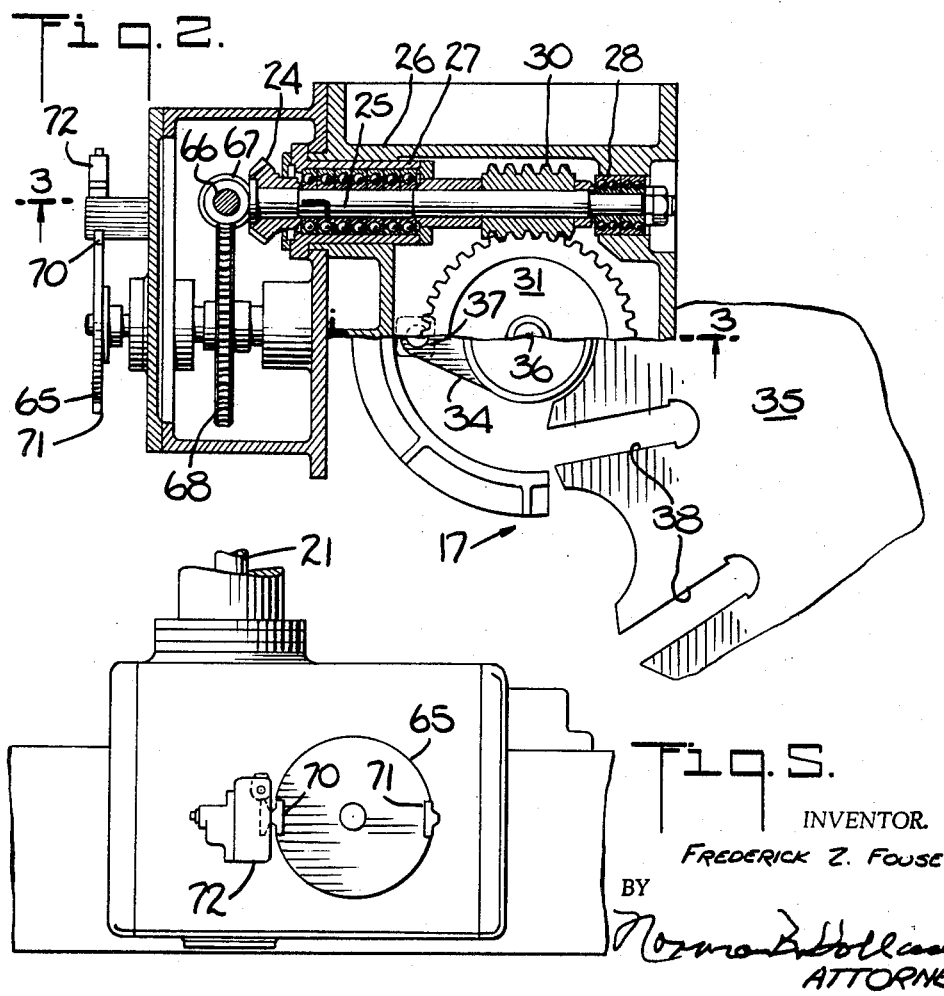

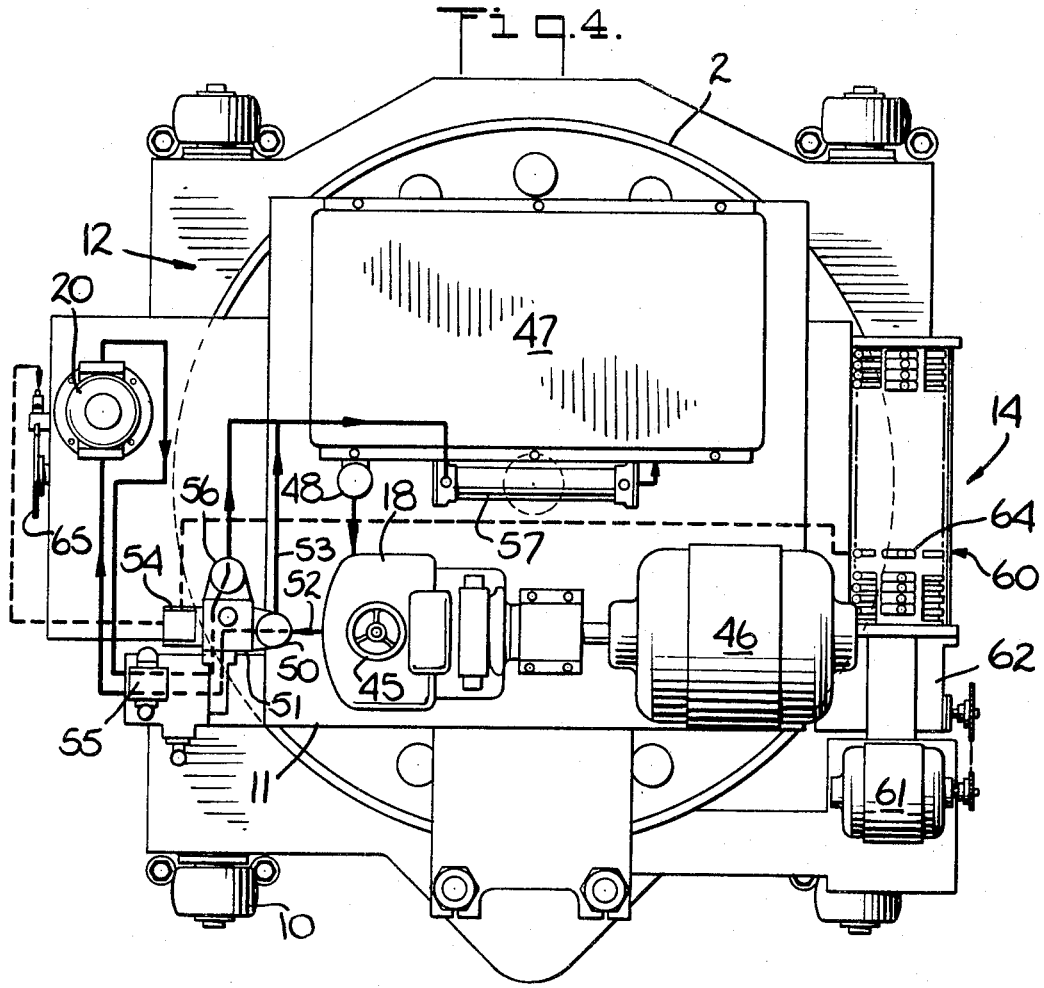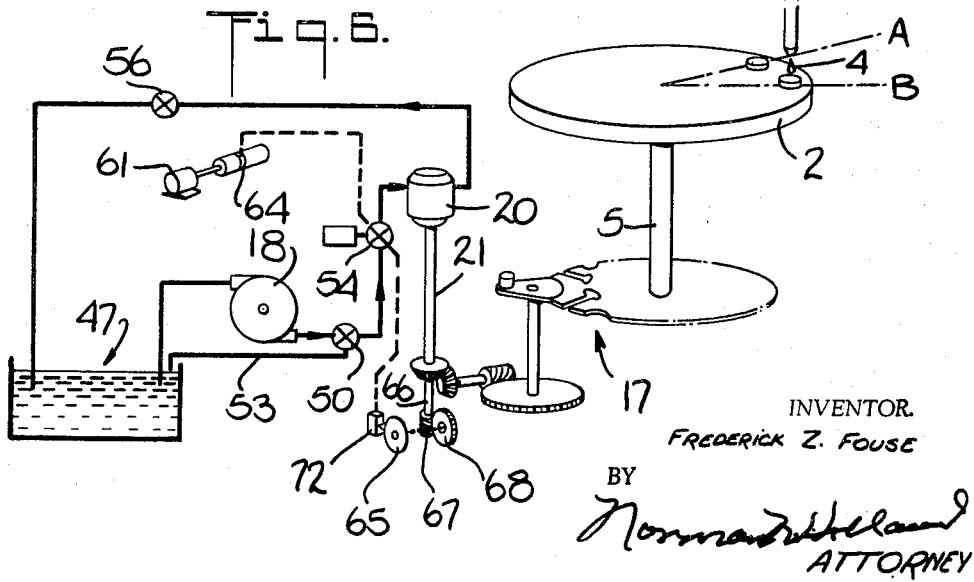
INVENTOR.
FREDERICK Z. FOUSE
BY
*Norman W. Holland*
ATTORNEY

3,388,985
DRIVE FOR GLASS-FORMING MACHINES
Frederick Z. Fouse, Lancaster, Ohio, assignor to Anchor Hocking Glass Corporation, Lancaster, Ohio, a corporation of Delaware
Filed Jan. 28, 1965, Ser. No. 428,638
3 Claims. (Cl. 65—361)

ABSTRACT OF THE DISCLOSURE

A drive and control system for independently regulating the indexing and dwelling times of the mold table in a glass-forming machine as well as achieving rapid indexing movement, fluid braking and overload drive protection. The system comprises a hydraulic motor which operates the mechanical indexing drive for the table and has valving in the motor control system for protectively limiting line pressure and trapping fluid in the motor for fluid braking. A sequentially operated air valve initiates the indexing action by opening an hydraulic valve which controls fluid flow to the hydraulic motor. Operation of the motor indexes the table through a Geneva drive. A timing wheel geared to the drive actuates another air valve for closing the hydraulic motor valve at the end of the indexing cycle thereby stopping the drive. The closing of the motor valve actuates a down-stream valve trapping fluid in the motor and thus giving controlled fluid braking. A relief valve is provided upstream from the pump which bypasses fluid to the reservoir when the motor is stopped by the control valve or an overload. The sequentially operated air valve again begins the operating cycle.

---

The present invention relates to glass-forming machines and more particularly to a new and improved drive and control arrangement for intermittently advancing the table of a glass-forming machine between glass-forming stations.

Glass-forming machines receive molten charges of glass, which are known as gobs, from a glass melting furnace and transform the molten glass gobs into finished articles such as tumblers. In forming the glass the machine advances the gob through a series of stations where individual glass-forming operations are performed on the gob. The initial step in the glass-forming operation involves depositing a molten glass gob into a mold which is located on the working surface or the table of the glass-forming machine. In subsequent steps, the glass gob is pressed into a finished article such as a tumbler. In other forming machines the glass gob is formed into a blank or parison and then transferred to a glass blowing machine to be blown into a bottle or jar.

In carrying out the glass-forming steps, it is necessary that the molten glass charge be advanced quickly between stations in order to increase its productivity of the glass-forming machine. In addition, the molten glass charge must be positioned with considerable accuracy at each station in order to properly perform the glass-forming operation. For example, in receiving the glass gob the mold must be accurately positioned so that the gob does not contact the sides of the mold. Further, the mold must be advanced to register accurately with the plunger which presses the gob into a finished article or a parison.

The present invention satisfies these requirements and has for one of its objects to provide a new and improved drive mechanism for glass-forming machines.

Another object of the present invention is to provide a control system for quickly and accurately positioning the glass-forming molds of the machine during its operation.

A further object of the present invention is to minimize transition time of the glass-forming machine in carrying glass gobs between glass-forming stations.

Another object of the present invention is to provide a drive arrangement and control system which will stop in the event overload conditions are encountered.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side elevational view partially broken away from the preferred embodiment of the glass-forming machine according to the present invention;

FIG. 2 is a sectional view of a portion of the driving mechanism taken along lines 2—2 of FIG. 1;

FIG. 3 is another sectional view of a portion of the drive mechanism taken along lines 3—3 of FIG. 2;

FIG. 4 is a top plan view illustrating the preferred drive and control components used in connection with the glass-forming machine of the present invention;

FIG. 5 is a front elevational view of a timing mechanism for controlling the glass-forming machine operation and which corresponds to the lower left-hand side of FIG. 1; and FIG. 6 is a schematic diagram illustrating the preferred drive and control arrangement of the present invention.

Referring now to the drawing, FIG. 1 illustrates a glass-forming machine which may be used with the present invention. By way of illustration, the present invention will be described in connection with a machine for forming pressed glassware such as tumblers. The machine 1 shown in FIG. 1 comprises a working surface or table 2 having a number of molds 3, preferably sixteen, for forming glass. The table 2 rotates in sequence to sixteen stations for glass-forming and cooling operations. Stated simply the glass-forming operation involves delivery of a glass gob 4 to the mold 3 and advancing the mold for pressing by means of a plunger (not shown) into the desired shape. Next the glass in the mold is cooled and removed from the mold. Finally, the molds progress through several cooling stations before repeating the cycle.

The working table 2 of the glass-forming machine illustrated in FIG. 1 is supported for rotation near the lower end of a hollow central column 5 by means of a suitable bearing 6. The hollow central column at its lower end is secured to a base plate 7 by means of a suitable bolt 8. The base plate may be mounted on wheels 10 for convenient positioning of the glass machine near a forehearth of a glass furnace (not shown).

At its upper end, the central column 5 supports a superstructure 11 upon which a preferred drive unit 12 and control mechanism 14 are mounted. Conveniently a number of rigid stays 15 may be used in providing additional support for the superstructure 11. If desired, the hollow central column 5 may communicate with a plenum chamber 16 for distributing compressed air for cooling various parts of the glass-forming machine.

In carrying out the glass-forming operations, the table 2 must be stopped or indexed at each of the glass-forming stations. This indexing is accomplished by rotating the table intermittently through the intermediation of the hydraulic drive unit 12 and a Geneva mechanism 17. The hydraulic drive unit 12 (FIG. 1) includes a hydraulic pump 18 and a hydraulic motor 20.

The hydraulic motor 20 drives the Geneva mechanism 17 through the intermediation of a vertical drive shaft 21 and bevel gears 22 and 24. As best shown in FIG. 2 the bevel gear 24 is mounted at one end of a stub shaft 25 located within a gear housing 26. The stub shaft 25, mounted on suitable bearings 27 and 28, includes a worm 30 for driving a wheel 31 mounted on the Geneva mechanism 17 by suitable means such as a bolt 32 (FIG. 3).

As is well-known in the art, Geneva mechanisms convert a continuous rotary motion to an intermittent or stop and go rotation. The Geneva mechanism 17 shown best in FIGS. 2 and 3 comprises a crank 34 and a gear 35. The crank 34 rotates on a shaft 36 and includes a pin 37 which engages radial slots on the gear 35. While the pin 37 is in a slot 38 the gear rotates. The result is intermittent rotation of the gear as the crank continuously rotates.

As shown in FIG. 1 the Geneva gear 35, located in a recess portion 40 of the base 7, is mounted for rotation on the central hollow column 5. At its upper end the Geneva gear 35 engages a flange 41 near the hub 42 of the rotating table. It will be appreciated then that as the hydraulic motor 20 rotates, an intermittent rotary movement is transmitted to the table 2 of the glass-forming machine. In this manner the table is indexed to each of the glass-forming stations present in the machine.

For a better appreciation of the driving unit 12 and control mechanisms 14 about to be described it is necessary to understand the nature of the movement of the working table as it advances from station to station in carrying out the glass forming operation. First, the control mechanism actuates the drive unit for advancing or indexing the working table to its next station. Then the control unit in cooperation with the drive unit provides for positive and accurate stopping of the table at a forming station. Next the control mechanism turns off the driving unit so that the table dwells at the station for a predetermined period, usually rom one to six seconds. After the dwell portion of the cycle the drive unit is again actuated and the table is advanced to the next station to continue the glass-forming operation.

Referring now to FIG. 4, the hydraulic drive unit 12 for rotating the table will be described. The hydraulic drive unit 12 comprises a hydraulic pump 18 for supplying pressurized fluid to the hydraulic motor 20 shown at the left in FIG. 4. Typically, the hydraulic pump 18 may be a variable volume piston pump with a hand wheel 45 for controlling output pressure as is well-known in the art. Driven by a suitable electric motor 46, the hydraulic pump 45 takes fluid suction from a reservoir 47 at a suction connection 48. The pump delivers the oil through a relief valve 50 to an oil manifold 51 through line 52. In the event the hydraulic pressure becomes excessive as when the table encounters an immovable object, such as a malfunctioning glass-forming plunger (not shown), the relief valve 50 will return the pressurized fluid to the reservoir 47 through a suitable line 53. Under normal conditions, the pressurized fluid passes through a hydraulic operating valve 54 which controls the flow of the hydraulic fluid to the hydraulic motor 20. The hydraulic control valve 54 is pneumatically actuated for turning the flow of hydraulic fluid on and off. Such valves are well-known and need not be described in detail.

If desired, a hand operating valve 55 may be included for adjusting the position of the table. In returning from the hydraulic motor 20 to the reservoir 47, the fluid passes through the hydraulic control valve 54 and a back pressure relief valve 56. Before entering the reservoir 47 the return oil passes through an oil cooler 57 mounted on the side of the oil reservoir 47.

The present invention provides a control system 14 for regulating the operation of the hydraulic drive unit 12 in accomplishing the table movement described above. Preferably, the control mechanism 14 comprises a bank of air puff valves 60 rotated by a suitable motor 61 and transmission 62. The air puff valves 60 are set in timed relation to each other in synchronizing the various steps of the glass-forming operation. In starting the working table toward its next station, one of the air puff valves 64 opens the hydraulic control valve 54 using compressed air. Pressurized fluid from the pump 18 enters the hydraulic motor 20 and the motor 20 moves the working table 2 to its next station by means of the Geneva mechanism described above.

When the table arrives at the next station it pauses or dwells long enough for the forming operation. The pause occurs when the hydraulic motor 20 is stopped by means of a timing wheel 65 shown at the left of FIG. 4.

The timing wheel 65 as best shown in FIG. 2 is rotated by means of a lower extension 66 (FIG. 3) of the vertical drive shaft 21. The extension 66 includes a worm 67 meshing with a wheel 68 for rotating the timing wheel 65.

The timing wheel 65 rotates in timed relationship with the Geneva mechanism 17 and as the Geneva mechanism 17 positions the table at the next station one of the cams 70 and 71 (FIG. 5) on the timing wheel 65 contacts a stop air puff valve 72. The stop air puff valve 72 closes the pneumatic hydraulic control valve 54 (FIG. 4) for turning off the hydraulic motor 20 for the dwell phase of the cycle. After dwelling, the table advances as the start air puff valve 64 returns to its original position for repeating the cycle.

It will be understood that the gear ratios of the table driving mechanism (FIG. 2) are such that the timing wheel 65 rotates 180° as the Geneva crank 34 rotates 360° or as the working table advances from one station to the next. If desired, one of the cams can be removed from the timing wheel in order to advance the working table two stations instead of one. This arrangement may be desirable in certain glass-forming operations as in pressing large glassware items like salad bowls.

Referring now to FIG. 6, the operation of the glass-forming machine will be described. In advancing the glass-forming table 2 from station A to station B in order to receive a molten gob of glass 4, the start air puff valve 64 opens the hydraulic control valve 54 so that hydraulic fluid under pressure from pump 18 turns the hydraulic motor 20. The hydraulic motor 20 then advances the table 2 to station B through the intermediation of the Geneva drive 17. When the table 2 is indexed at station B the table pauses or dwells for a short period to receive the glass gob. The pause occurs when the hydraulic motor 20 is stopped. The motor 20 is stopped as timing wheel 65 and the air puff valve cooperate to close the hydraulic control valve 54.

To prevent the inertia of the rotating table from carrying it beyond station B, back pressure relief valve 56 in the hydraulic system closes and cooperates with the closed control valve 54 to trap oil in the pistons in the hydraulic motor 20. The back pressure relief valve 56 closes due to lower pressure when the control valve 54 closes. This action brakes the hydraulic motor 20 and provides for an instant and accurate stopping of the working table at each glass-forming station.

After pausing, the table 2 is indexed to the next station as start air puff valve 64 returns to its original position for starting the motor 20.

It will be appreciated that when control valve 54 is closed, pressurized fluid from the constantly operating pump 18 is returned to the reservoir 47 through the relief valve 50. In order to provide a faster drive of the hydraulic table between stations, it is simply necessary to increase the pressure of the hydraulic fluid leaving the hydraulic pump 18. This can be accomplished by an adjustment in the hand wheel control 45 and by resetting the pressure relief valve 50 (FIG. 2) as is well-known in the art.

It will be seen that applicant has provided an effective driving mechanism for glass-forming machines which quickly drives the working table from station to station to minimize the period of transition. In addition the drive system is safe, and can easily withstand overload conditions without break-down. Moreover, the valves of the hydraulic system provide effective braking of the hydraulic motor so as to accurately stop the working table as it arrives at the operating stations.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. In a glass-forming machine having a rotatably mounted mold table for supporting a plurality of spaced molds and for presenting the molds successively to glass-forming stations by intermittent rotary motion of the mold table, an improved mold table drive means comprising the combination of a Geneva drive means having its output shaft operatively coupled to the mold table for providing the intermittent mold table movement, a hydraulically powered drive motor, means operatively coupling the output shaft of the drive motor to the input crank of the Geneva drive means, means for continuously supplying hydraulic drive fluid under pressure to the drive motor, a drive motor control valve for said fluid supplying means for stopping and starting the drive motor, motor start valve control means coupled to said drive motor control valve for periodically opening said drive motor control valve to start the drive motor at predetermined intervals, motor stop control means operatively coupled to the drive motor output shaft and connected to said drive motor control valve for closing said drive motor control valve responsive to a predetermined movement of the drive motor output shaft, a hydraulic pressure relief valve connected in series with the drive motor control valve and said fluid supplying means, a hydraulic fluid outlet for said drive motor, and a pressure relief valve connected in said fluid outlet whereby said drive motor is partially braked by fluid pressure created by said relief valve when said drive motor control valve is closed.

2. The glass-forming machine as claimed in claim 1 which further comprises a plurality of air puff valves and means for operating them in timed relation, said drive motor control valve comprising an air operated valve, and said motor start valve control means comprising one of said air puff valves.

3. The glass-forming machine as claimed in claim 1 in which said drive motor control valve comprises an air operated valve, said motor stop valve control means comprises an air puff valve and the coupling between said motor stop valve control means and said drive motor output shaft comprises a cam operatively coupled to the drive motor output shaft.

References Cited

UNITED STATES PATENTS

| | | | |
|---|---|---|---|
| 1,878,485 | 9/1932 | Ganter | 65—163 |
| 2,010,777 | 8/1935 | Grotta | 65—164 |
| 2,146,482 | 2/1939 | Miller | 65—159 |
| 2,284,508 | 5/1942 | Bert | 65—361 |
| 2,958,159 | 11/1960 | Denman | 65—159 |

DONALL H. SYLVESTER, *Primary Examiner.*

FRANK W. MIGA, *Examiner.*